United States Patent [19]

Moriguchi et al.

[11] Patent Number: 5,771,163
[45] Date of Patent: Jun. 23, 1998

[54] AC-DC CONVERTER APPARATUS

[75] Inventors: Haruo Moriguchi, Itami; Kenzo Danjo, Soraku-gun; Shigeru Okamoto, Hirakata; Takashi Hashimoto, Kobe; Kunio Karino, Suita, all of Japan

[73] Assignee: Sansha Electric Manufacturing Company, Limited, Osaka, Japan

[21] Appl. No.: 752,302

[22] Filed: Nov. 19, 1996

[51] Int. Cl.$^6$ .............................. H02M 7/00; H02M 3/24; H02M 3/335
[52] U.S. Cl. ................................ 363/71; 363/98; 363/25
[58] Field of Search ................................ 363/71, 98, 97, 363/80, 79, 17, 25, 37; 307/82

[56] References Cited

U.S. PATENT DOCUMENTS

| | | | |
|---|---|---|---|
| 4,062,057 | 12/1977 | Perkins et al. | 363/71 |
| 4,347,558 | 8/1982 | Kalinsky | 363/17 |
| 4,525,774 | 6/1985 | Kino et al. | 363/17 |
| 4,686,619 | 8/1987 | Edwards | 363/126 |
| 5,229,928 | 7/1993 | Karlsson et al. | 363/65 |
| 5,272,313 | 12/1993 | Karino et al. | 219/130.21 |
| 5,355,295 | 10/1994 | Brennen | 363/71 |

*Primary Examiner*—Peter S. Wong
*Assistant Examiner*—Bao Q. Vu
*Attorney, Agent, or Firm*—Duane, Morris & Heckscher LLP

[57] ABSTRACT

A DC power supply apparatus includes a rectifier circuit for rectifying an input AC voltage to develop a rectified voltage between two output terminals thereof. First and second smoothing capacitors are connected in series between the output terminals of the rectifier circuit. First and second voltages developed across the first and second capacitors are applied to first and second inverters which convert the applied voltages to high-frequency voltages, which, in turn, are applied to a transformer. The transformer develops a transformed high-frequency voltage which is converted to a DC voltage by a converter. A voltage detector detects the first and second voltages, and the detected first and second voltages are compared in a microprocessor. An inverter control circuit controls the first and second inverters in accordance with the result of comparison, in a sense to make the voltages across the first and second smoothing capacitors equal.

4 Claims, 7 Drawing Sheets

AC-DC CONVERTER APPARATUS

This invention relates to a DC power supply apparatus and, more particularly, to such an apparatus including two inverters for converting a DC voltage to a high frequency voltage.

BACKGROUND OF THE INVENTION

One of conventional DC power supply apparatus includes a first converter which converts a commercial AC voltage into a DC voltage. The DC voltage is voltage-divided into two, which are applied respectively to two high-frequency inverters having their inputs connected in series. The high-frequency inverters convert the applied DC voltages into high-frequency voltages. The high-frequency voltages are then voltage transformed and combined with each other in a transformer. The combination of the two high-frequency voltages is converted back to a DC voltage in a second converter, which is applied to a load. A DC power supply apparatus of this type is disclosed in U.S. Pat. No. 5,272,313.

A high-frequency inverter includes a plurality of semiconductor switching devices which are alternately turned on and off. As the withstand voltage of a semiconductor switching device is higher, its switching speed is lower and the switching loss is larger. Furthermore, as the withstand voltage of a semiconductor switching device is higher, the voltage necessary for rendering it conductive is higher and the loss in its conductive state is larger. Accordingly, semiconductor switching devices used in a high-frequency inverter should preferably have a low withstand voltage.

However, as a DC voltage applied to a high-frequency inverter is higher, the withstand voltage of semiconductor switching devices must be higher.

Two serially connected smoothing capacitors are used in a converter to voltage-divide an AC voltage into two DC voltages. The resulting two DC voltages are applied to respective ones of two high-frequency inverters connected in series to convert them into high-frequency voltages. With this arrangement, semiconductor switching devices having a lower withstand voltage can be used in the respective inverters. This is the reason why two serially connected high-frequency inverters are used in the prior art apparatus.

The converter and the high-frequency inverters are so designed that the voltages developed across the respective ones of the two series connected smoothing capacitors are balanced with respect to each other. However, because of variations in characteristics of switching devices used in the two high-frequency inverters and variations in constants of circuits driving the switching devices, the voltages across the respective ones of the two smoothing capacitors may be unbalanced. This results in a higher voltage across one smoothing capacitor and a lower voltage across the other smoothing capacitor. Usually, electrolytic capacitors are used as the smoothing capacitors. Electrolytic capacitors may be damaged when a voltage above their withstand voltage is applied thereto.

Accordingly, it is desirable to balance the voltages developed across the two smoothing capacitors. Further, it is desirable to disable the high-frequency inverters when the unbalanced voltages are developed across the smoothing capacitors, since such imbalance in the developed voltage may have been caused by the high-frequency inverters. It is also desirable to disable the high-frequency inverters when it is failed to balance the voltages across the respective smoothing capacitors.

Sometimes surge voltage may be superposed on the commercial AC voltage. If the first converter is operating, such surge voltage charges the smoothing electrolytic capacitors. If the high-frequency inverters are also operating, power attributable to the surge voltages stored on the smoothing capacitors is supplied to the load, and, therefore, the voltages across the smoothing capacitors do not increase. However, if the high-frequency inverters are not operating, the power attributable to the surge voltages increases the voltages across the smoothing capacitors to a value above the withstand voltage of the smoothing capacitors.

In order to prevent it, the voltages across the two smoothing capacitors are detected, and the detection voltages are compared in comparators with a rated voltage of the capacitors. When the detected voltage is above the rated voltage, the comparator develops an output signal which is applied to a disable signal generating circuit having a small time constant of, for example, 0.5 milliseconds. In response to the output from the comparator, the disable signal generating circuit instantly generates a disable signal which is applied to disable the inverters or the first converter.

Since the time constant of the disable signal generating circuit is short, if noise is introduced into, for example, lines connecting the comparator and the disable signal generating circuit, the disable signal generating circuit may respond to the noise and generate the disable signal. Such noise occurs very frequently, and, therefore, even when the detected voltage does not exceeds the rated voltage, the inverters or the first converter is disabled very frequently.

Accordingly, it is desired that the first converter or the inverters should not be erroneously disabled by such noise.

SUMMARY OF THE INVENTION

According to a first aspect of the present invention, a DC power supply apparatus includes rectifying means which rectifies an input AC voltage to produce a rectified voltage between two output terminals thereof. First and second smoothing capacitors are connected in series between the two output terminals of the rectifying means. Voltages across the first and second smoothing capacitors are applied to first and second inverter means, respectively, which convert the voltages across the first and second smoothing capacitors into respective high-frequency voltages. The high-frequency voltages from the first and second inverter means are applied to voltage transforming means, which produces voltage-transformed high-frequency voltages. The voltage-transformed high-frequency voltages are converted into DC voltages in converting means.

The DC power supply apparatus includes voltage detecting means for detecting the voltages across the respective ones of the first and second smoothing capacitors. First and second voltages detected across the first and second smoothing capacitors, respectively, are compared with each other in comparing means. In accordance with the result of the comparison, control means controls the first and second inverter means in such a manner that the first and second voltages across the first and second smoothing capacitors become equal to each other.

Each of the first and second inverter means may include a plurality of switching means. The control means includes inverter control means which causes the switching means of the first and second inverter means to be alternately turned on and off repeatedly in an appropriate order and controls the conduction periods of the switching means in such a manner that the output voltage of the converting means becomes equal to a preset value. The control means includes further means for increasing the conduction period of the switching means of the first inverter means when the comparing means judges that the first voltage is larger than the second voltage, and increasing the conduction period of the switching means of the second inverter means when the comparing means judges that the second voltage is larger than the first voltage.

The control means may include the inverter control means, and means for decreasing the conduction period of the switching means of the second inverter means when the comparing means judges that the first voltage is larger than the second voltage and reducing the conduction period of the switching means of the first inverter means when the comparing means judges that the second voltage is larger than the first voltage.

The control means may include means for increasing the conduction period of the switching means of the first inverter means and decreasing the conduction period of the switching means of the second inverter means when the comparing means judges that the first voltage is larger than the second voltage, and for decreasing the conduction period of the switching means of the first inverter means and increasing the conduction period of the switching means of the second inverter means when the comparing means judges that the second voltage is higher than the first voltage.

According to a second aspect of the present invention, a DC power supply apparatus includes rectifying means, first and second smoothing capacitors, first and second inverter means, voltage-transforming means, converting means, and voltage detecting means, which are all similar to the corresponding components of the DC power supply apparatus according to the first aspect of the invention described above. The DC power supply apparatus according to the second aspect of the present invention further includes comparing means which compares the difference between first and second voltages developed across the first and second smoothing capacitors as detected by the voltage detecting means, with a reference voltage. When the difference is larger than the reference voltage, the comparing means produces an output. The reference voltage may be, for example, the difference between the voltages developed across the two smoothing capacitors when the voltage across one of the smoothing capacitors is at the rated value thereof. Disabling means responds to the output of the comparing means and disables the first and second inverter means. The disabling means has a slow response to the output of the comparing means.

The comparing means may be modified so as to compare the first and second voltages across the first and second smoothing capacitors, respectively, as detected by the voltage detecting means, with a reference voltage, and develop an output when either of the first and second voltages is larger than the reference voltage. In this modification, the reference voltage may be the rated voltage of the capacitors. The output of the comparing means is applied to time constant means. When receiving the output of the comparing means, the time constant means conditions the first and second inverter means not to generate high-frequency voltages. The response of the time constant means to the output of the comparing means is slow. The time constant means may disable the first and second inverter means, or it may interrupt the supply of AC voltage to the rectifying means.

DETAILED DESCRIPTION OF THE INVENTION

Figure 1:
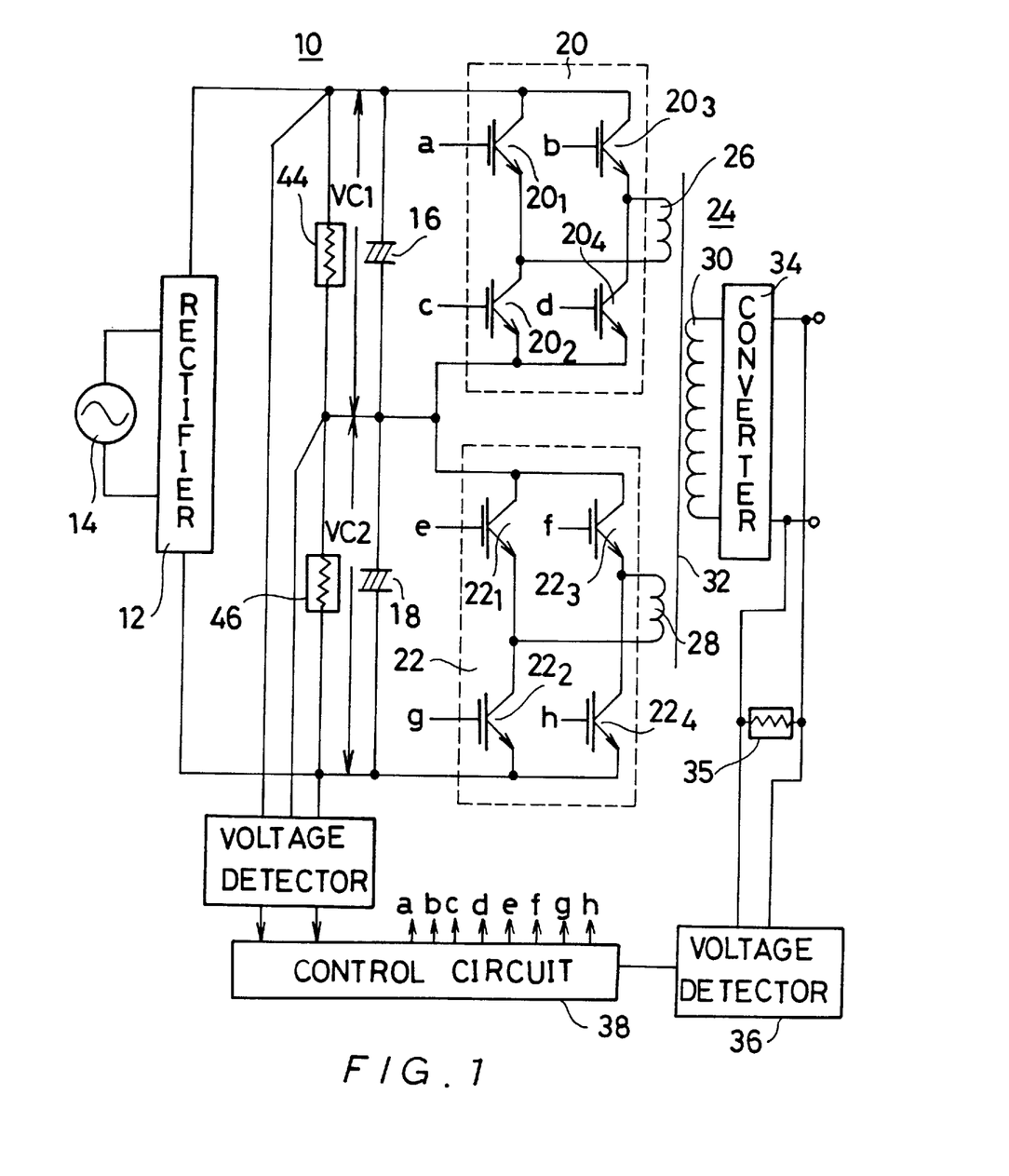
FIG. 1 is a circuit diagram of a DC power supply apparatus according to one embodiment of the present invention.

A DC power supply apparatus 10 according to one embodiment of the present invention is shown in FIG. 1. The DC power supply apparatus 10 includes rectifying means, e.g. a rectifier circuit 12. The rectifier circuit 12 receives at its input an commercial AC voltage supplied from, for example, a commercial AC power supply 14. The rectifier circuit 12 may be a full-wave rectifier circuit or a half-wave rectifier circuit. The commercial AC power supply 14 may be a single-phase commercial AC power supply or a three-phase commercial AC power supply. A first smoothing capacitor 16 and a second smoothing capacitor 18 are connected in series across the output of the rectifier circuit 12. The smoothing capacitors 16 and 18 may be electrolytic capacitors having the same capacitance. Across the smoothing capacitors 16 and 18, voltages VC1 and VC2 which result from voltage-dividing the DC voltage across the output of the rectifier circuit 12 are developed, respectively.

The voltage VC1 is applied to high-frequency inverter means, e.g. a high-frequency inverter 20, and the voltage VC2 is applied to another high-frequency inverter means, e.g. a high-frequency inverter 22. Each of the inverters 20 and 22 comprise a plurality of semiconductor switching devices, e.g. insulated gate bipolar transistors (IGBT's), $20_1$, $20_2$, $20_3$, $20_4$ and $22_1$, $22_2$, $22_3$, $22_4$, having substantially the same characteristic. The semiconductor switching devices $20_1$, $20_2$, $20_3$, $20_4$ and $22_1$, $22_2$, $22_3$, $22_4$, are connected to form bridges, respectively. The semiconductor switching devices $20_1$, $20_2$, $20_3$, and $20_4$ of the inverter 20 are controlled by signals a, b, c, and d supplied from a control circuit 38 described in detail later in such a manner that the devices $20_1$, and $20_4$ are alternately turned on and off together and the devices $20_2$ and $20_3$ are alternately turned on and off together. When the devices $20_1$, and $20_4$ are conductive, the devices $20_2$ and $20_3$ are nonconductive, and vice versa. The semiconductor switching devices $22_1$, $22_2$, $22_3$, and $22_4$ are controlled in the same manner as the semiconductor devices $20_1$, $20_2$, $20_3$, and $20_4$ of the inverter 20. The conduction period of the semiconductor switching devices of the inverter 20 and the conduction period of the semiconductor switching devices of the inverter 22 are separately controlled so as to develop desired high-frequency voltages at the outputs of the inverters 20 and 22.

In place of IGBT's, FET's or other types of bipolar transistors may be used. Furthermore, as is known in the art, the semiconductor switching devices $20_1$, and $20_2$ of the inverter 20 and the semiconductor switching devices $22_1$, and $22_2$ of the inverter 22 may be replaced by capacitors.

The high-frequency voltages developed at the outputs of the high-frequency inverters 20 and 22 are applied to voltage transforming means, e.g. a transformer 24. The transformer 24 has two primary windings 26 and 28 having the same number of turns, and a single secondary winding 30 having a number of turns different from the number of turns of the primary windings 26 and 28. The windings 26, 28 and 30 are wound on a single core 32. The high-frequency voltages from the high-frequency inverters 20 and 22 are applied across the primary windings 26 and 28, respectively. A high-frequency voltage based on the voltages applied across the primary windings 26 and 28 is induced across the secondary winding 30. That is, a combination of voltage-transformed versions of the high-frequency voltages from the inverters 20 and 22 is developed across the secondary winding 30.

The transformer 24 may be replaced by two transformers each including one primary winding and one secondary winding which are wound on a signal core, with the respective primary windings receiving the high-frequency voltages from the inverters 20 and 22 and with the secondary windings of the two transformers being connected in series or in parallel.

A converter 34 is connected to the secondary winding 30 of the transformer 24. The converter 34 may include a rectifier circuit including, for example, a full-wave rectifier or half-wave rectifier, and a smoothing capacitor for smoothing the output of the rectifier circuit. The converter 34 converts the high-frequency voltage induced across the secondary winding 30 into a DC voltage. The DC voltage is, then, applied to a load or between, for example, a torch of a welder and a workpiece.

A resistor 35 is connected across the output of the converter 34 for detecting the output DC voltage. The DC voltage across the resistor 35 is detected by a voltage detector 36, which develops a detection voltage $V_{DET}$. The detection voltage $V_{DET}$ is applied to control means, e.g. inverter control circuits 40 and 42 (FIG. 2) in a control circuit 38.

Figure 2:
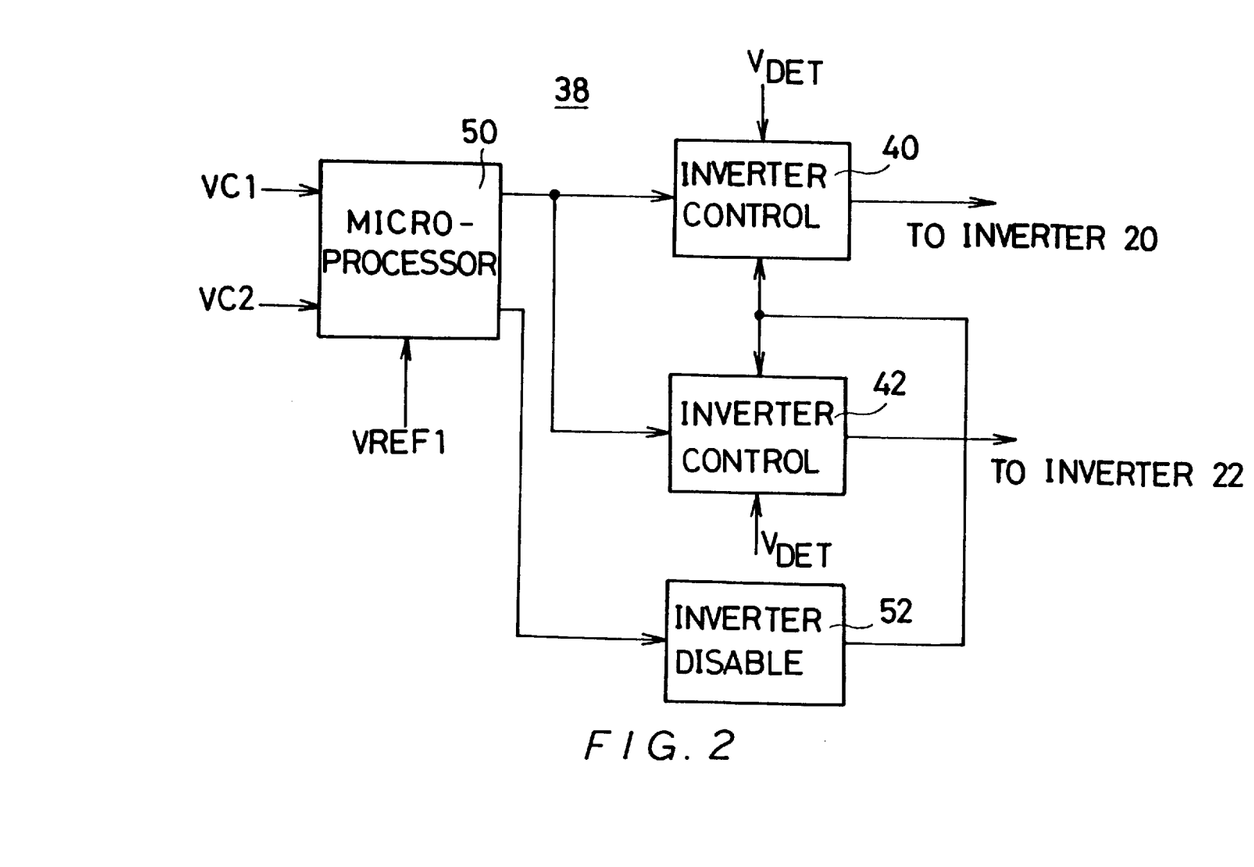
FIG. 2 is a block diagram of a first example of a control circuit shown in FIG. 1.

The inverter control circuit 40 controls the respective semiconductor switching devices $20_1$, $20_2$, $20_3$ and $20_4$ of the high-frequency inverter 20 to be alternately conductive and non-conductive to thereby produce a high-frequency voltage, and the inverter control circuit 42 controls the respective semiconductor switching devices $22_1$, $22_2$, $22_3$, and $22_4$ of the high-frequency inverter 22 to be alternately conductive and non-conductive to thereby produce a high-frequency voltage. The sum of the periods during which a semiconductor switching device is conductive and non-conductive is constant, and the conduction period is changed in such a manner that the detection voltage $V_{DET}$ is equal to a preset voltage. The conduction period of the semiconductor switching devices is determined by a period, i.e. a pulse width, during which a signal applied from the respective inverter control circuits 40 and 42 to the inverters 20 and 22 is at a high (H) level, and the non-conduction period is determined by the period during which the signal applied to the inverters 20 and 22 is at a low (L) level. In other words, the semiconductor switching devices $20_1$, $20_2$, $20_3$, $20_4$ and $22_1$, $22_2$, $22_3$, $22_4$ are pulse-width-modulation (PWM) controlled.

Alternatively, current flowing from the converter 34 through the load may be detected, with the semiconductor switching devices PWM controlled so as to make the current equal to a preset value. In a still another alternative, power supplied by the converter 34 to the load may be detected, in which case the semiconductor switching devices are controlled so as to make the power equal to a preset value.

As shown in FIG. 1, voltage detecting resistors 44 and 46 are connected in parallel with the smoothing capacitors 16 and 18, respectively. The voltage across the resistor 44 and the voltage across the resistor 46 are applied to a voltage detector 48, and thus, the voltages VC1 and VC2 across the smoothing capacitors 16 and 18, respectively, are comparing means, e.g. a microprocessor 50 (shown in FIG. 2), in the control circuit 38.

As described previously, due to variations in characteristic of the semiconductor switching devices $20_1$, $20_2$, $20_3$, $20_4$ and $22_1$, $22_2$, $22_3$, $22_4$ in the high-frequency inverters 20 and 22, and due to variations in circuit constant of the inverter control circuits 40 and 42, the voltages developed across the respective smoothing capacitors 16 and 18 may become unequal or unbalanced. In order to detect such imbalance, the microprocessor 50 compares the voltages VC1 and VC2 developed across the smoothing capacitors 16 and 18 with each other, in Step S2 and Step S6 shown in FIG. 3.

The fact that the voltage VC1 across the capacitor 16 is larger than the voltage VC2 across the capacitor 18 means that the power supplied by the high-frequency inverter 22 to the transformer 24 is larger than the power supplied by the inverter 20 to the transformer 24. Accordingly, if the microprocessor 50 determines in Step S2 in the flow chart of FIG. 3 that VC1 is larger than VC2, the microprocessor 50 commands the inverter control circuit 40 to increase the pulse width of the signal to be applied to the inverter 20 from the inverter control circuit 40 by an appropriate amount and, at the same time, commands the inverter control circuit 42 to reduce the pulse width of the signal the circuit 42 applied to the inverter 22 by an appropriate amount so that the power from the high-frequency inverter 20 increases and the power from the high-frequency inverter 22 decreases (Step S4).

Figure 3:
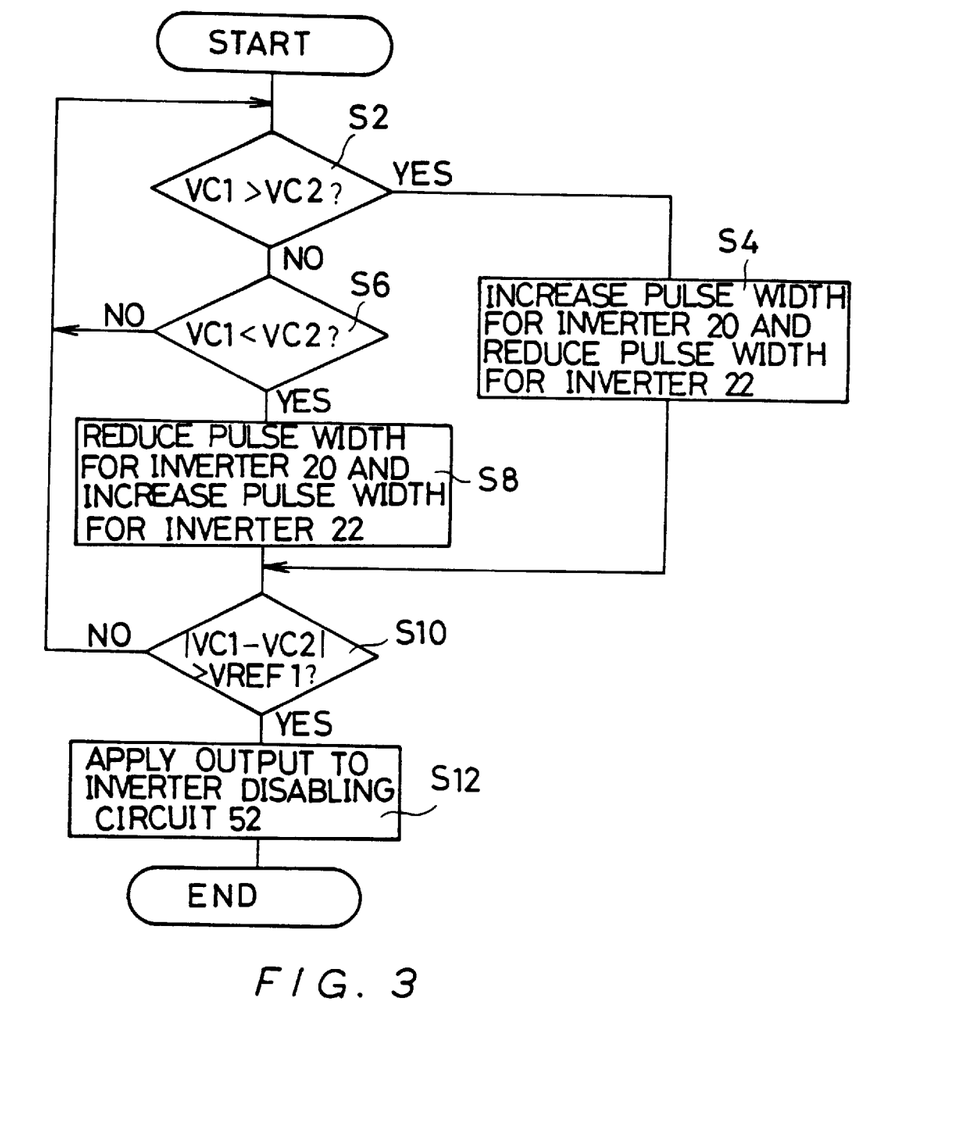
FIG. 3 is a flow chart showing the operation of the control circuit shown in FIG. 2.

If the microprocessor 50 determines in Step S2 that VC1 is not larger than VC2, the microprocessor 50, then, determines whether VC1 is smaller than VC2 in Step S6. If it is determined that VC1 is not smaller than VC2, VC1 is equal to VC2 because VC1 has been judged not to be larger than VC2 in Step S2, and, then, the processing returns to Step S2.

If it is judged in Step S6 that VC1 is smaller than VC2, which means that the power supplied by the inverter 20 to the transformer 24 is larger than the power supplied by the inverter 22 to the transformer 24, the microprocessor 50 commands the inverter control circuit 40 to provide a signal having its pulse width reduced by an appropriate amount to the inverter 20 so as to reduce the power supplied from the inverter 20 to the transformer 24, and commands the inverter control circuit 42 to provide a signal having its pulse width increased by an appropriate amount to the inverter 22 so as to increase the power supplied from the inverter 22 to the transformer 24 (Step S8).

In Step S10 following Step S4 or Step S8, the microprocessor 50 judges whether the absolute value of the difference between VC1 and VC2 is larger than a reference voltage $V_{REF^1}$.

Let it be assumed that the AC voltage supplied from the commercial AC power supply 14 is 400 V. A maximum voltage of about 680 V (=400*1.2*$\sqrt{2}$) may be applied across the series combination of the smoothing capacitors 16 and 18, where the numeral "1.2" is a maximum change rate of the AC voltage. Thus, if the inverters 20 and 22 are balanced, VC1 and VC2 are both 340 V. If the smoothing capacitors 16 and 18 are electrolytic capacitors having a rated voltage of 400 V, the rated voltage of either capacitor may be exceeded when either one of VC1 and VC2 increases by more than 60 V. If, for example, the voltage across the smoothing capacitor 16 increases by 60 V to 400 V, the voltage across the capacitor 18 decreases by 60 V to 280. Thus, when the absolute value of the difference between the voltages across the respective smoothing capacitors 16 and 18 exceeds 120 V, the rated voltage of either one of the capacitors 16 and 18 is exceeded. Thus, whether the voltage across either one of the smoothing capacitors exceeds its rated voltage or not can be judged by executing Step S10 with the reference voltage $V_{REF^1}$ set to the difference between the voltages across the two smoothing capacitors developed when one of the two voltages is at the rated value.

If the absolute value of the difference between VC1 and VC2 does not exceed the reference voltage $V_{REF^1}$, Steps S2, S6 and S8 are executed to make VC1 and VC2 balance. On the other hand, if the absolute value of the difference between VC1 and VC2 exceeds the reference voltage $V_{REF^1}$, which means that the voltage across one of the smoothing capacitors exceeds the rated voltage of that capacitor, the microprocessor 50 develops an output signal for application to time constant means, e.g. an inverter disabling circuit 52 (FIG. 2) to disable the high-frequency inverters 20 and 22 (Step S12). Step S12 is useful when, for example, increase or decrease of the signal pulse widths for making VC1 and VC2 equal cannot be effected due to failure of the semiconductor switching devices.

The inverter disabling circuit 52 provides a disable signal to te inverter control circuits 40 and 42 in response to the output signal from the microprocessor 50. Then, the inverter control circuits 40 and 42 disable the respective inverters 20 and 22. That is, the inverters 20 and 22, which have caused the imbalance between the voltages across the smoothing capacitors, are disabled, and, therefore, the imbalance of the smoothing capacitor voltages is removed.

The inverter disabling circuit 52 may includes a time constant circuit, e.g. an integrator circuit formed of a capacitor and a resistor. The time constant circuit has a large time constant, e.g. from 1 to 3 seconds. Accordingly, it takes some time for the circuit 52 to develop a disable signal after it receives the output signal from the microprocessor 50. With this arrangement, even if the inverter disabling circuit 52 receives noise due to some reason, the circuit 52 is prevented from responding to such noise. It should be noted that although the development of the disable signal by the circuit 52 is more or less delayed, the inverters 20 and 22 can be disabled before the voltage across the smoothing capacitor 16 or 18 exceeds the withstand voltage of the capacitors 16 and 18 because they are electrolytic capacitors whose withstand voltage is somewhat higher than their rated voltage.

In the described arrangement, the microprocessor 50 increases the pulse width applied to the inverter 20 and decreases the pulse width applied to the inverter 22 when VC1 is larger than VC2, and decreases the pulse width for the inverter 20 and increases the pulse width for the inverter 22 when VC1 is smaller than VC2. However, the microprocessor 50 may be arranged to increase the pulse width applied to the inverter 20 when VC1 is larger than VC2, and decreases the pulse width for the inverter 20 when VC1 is smaller than VC2. Alternatively, the microprocessor 50 may decreases the pulse width for the inverter 22 when VC1 is larger than VC2, and increases the pulse width for the inverter 20 when VC1 is smaller than VC2.

In addition, in the described embodiment, the microprocessor 50 causes the inverters 20 and 22 to be disabled by the inverter disabling circuit 52 when the absolute value of the difference between VC1 and VC2 is larger than the reference value $V_{REF^1}$. However, the inverter disabling circuit 52 may be omitted and, also, the step of comparing the absolute value of the difference between VC1 and VC2 with the reference voltage $V_{REF^1}$ may be omitted. Alternatively, the microprocessor 50 may be arranged only to cause the inverters 20 and 22 to be disabled when the absolute value of the difference between VC1 and VC2 is larger than the reference voltage $V_{REF^1}$, but the pulse width modulation based on the result of comparison of VC1 and VC2 may be omitted.

Figure 4:
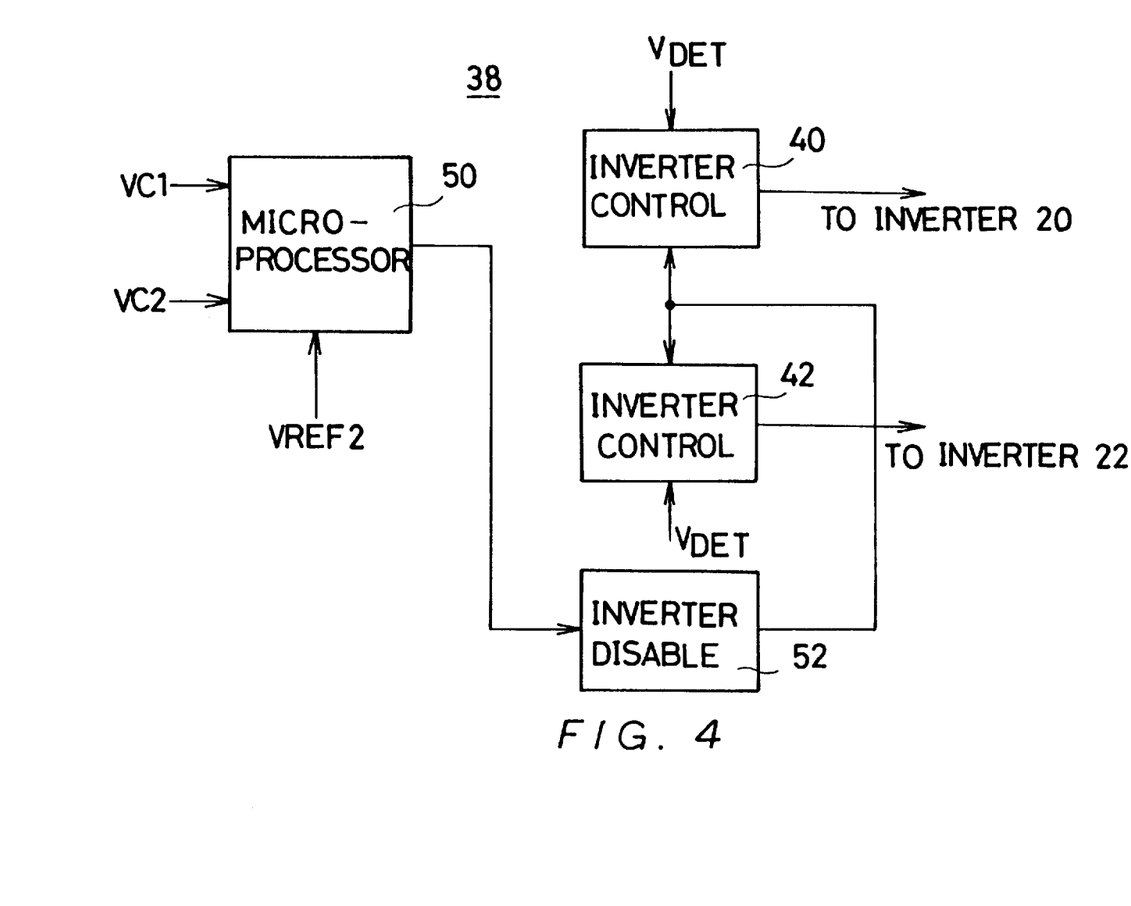
FIG. 4 is a block diagram of a second example of the control circuit.
Figure 5:
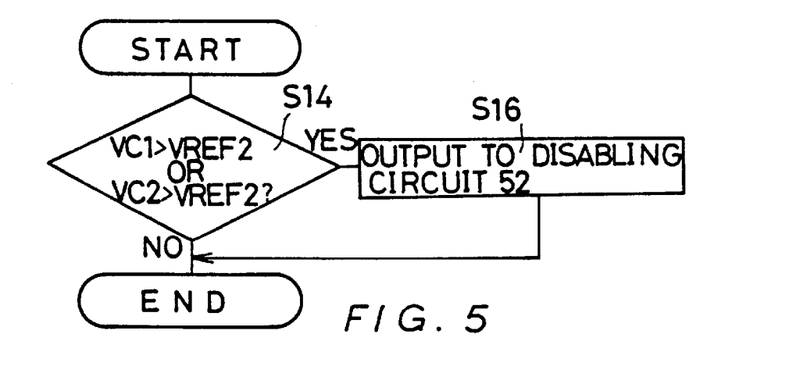
FIG. 5 is a flow chart showing the operation of the control circuit of FIG. 4.

FIGS. 4 and 5 illustrate a second example of the control circuit 38 of FIG. 1. The reference numerals for the components in FIGS. 1 and 2 are used for similar components in FIGS. 4 and 5, and their detailed description is not made.

In the microprocessor 50 of FIG. 4, the rated voltage of the smoothing capacitors 16 and 18, for example, is set as a reference voltage $V_{REF^2}$, in place of $V_{REF^1}$ of FIG. 2. As shown in FIG. 5, the microprocessor 50 compares VC1 and VC2 with the reference voltage $V_{REF^2}$, respectively (Step S14), and when either one of VC1 and VC2 is larger than $V_{REF^2}$, the microprocessor 50 provides an output signal to the inverter disabling circuit 52 (Step S16). More specifically, the microprocessor 50 first compares VC1 with the reference voltage $V_{REF^2}$. If VC1 is larger than $V_{REF^2}$, the process advances to Step S16. If VC1 is not larger than $V_{REF^2}$, the microprocessor 50 compares VC2 with $V_{REF^2}$. If VC2 is larger than $V_{REF^2}$, the process advances to Step S16. If the VC2 is not larger than $V_{REF^2}$, the process ends. The order of comparison of VC1 and VC2 with $V_{REF^2}$ may be reversed.

This control circuit 38, too, disables the inverters 20 and 22 when the voltages across the smoothing capacitors 16 and 18 are unbalanced and one of the capacitor voltages exceeds its rated voltage.

Figure 6:
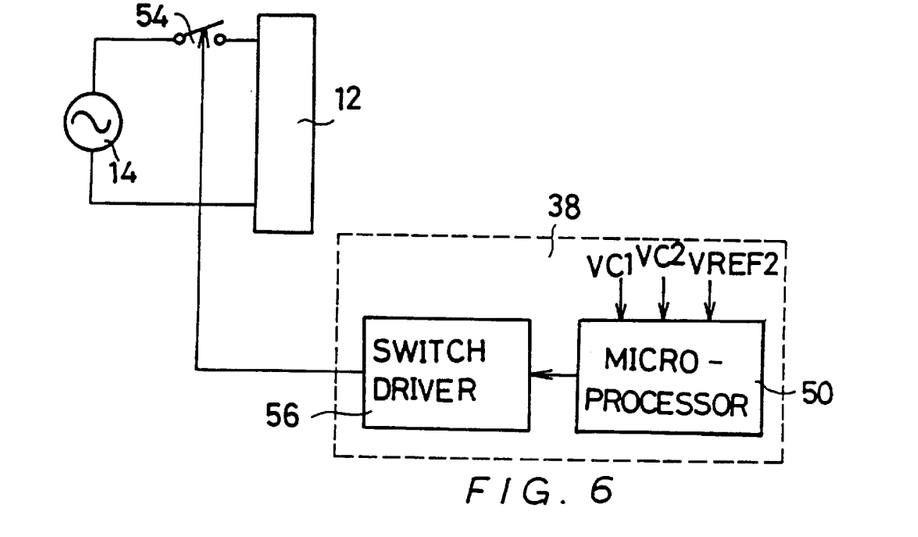
FIG. 6 is a block diagram of part of a third example of the control circuit.
Figure 7:
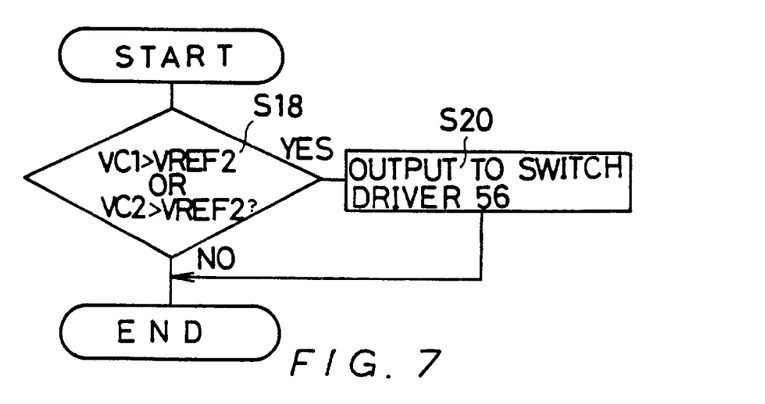
FIG. 7 is a flow chart showing the operation of the circuit shown in FIG. 6.

In FIGS. 6 and 7, a third example of the control circuit 38 is shown. Similar components to the ones used in the control circuit 38 described above are assigned with the same reference numerals and their details are not described.

When this control circuit is used, a semiconductor switching device 54 is connected between the commercial AC power supply 14 and the rectifier circuit 12. A switch driver circuit 56 is substituted for the inverter disabling circuit 52. In response to the signal from the microprocessor 50, the switch driver circuit 56 opens the semiconductor switching device 54. Similar to the inverter disabling circuit, the switch driver circuit 56 includes an integrator circuit having a time constant of a similar magnitude to that of the inverter disabling circuit 52.

The microprocessor 50 receives VC1 and VC2, and the reference voltage $V_{REF^2}$ has been set therein. As shown in FIG. 7, the microprocessor 50 performs the comparison of VC1 with $V_{REF^2}$ and the comparison of VC2 with $V_{REF^2}$ in Step S18, and provides an output signal to the switch driver circuit 56 if either one of VC1 and VC2 is larger than the reference voltage $V_{REF^2}$ (Step S20). In response to this output signal from the microprocessor 50, the switch driver circuit 56 opens the semiconductor switching device 54.

One of causes for the imbalance between the voltages VC1 and VC2 across the smoothing capacitors 16 and 18, respectively, other than variations in characteristic of the inverters 20 and 22, is superposition of a surge voltage on the AC voltage from the commercial AC power supply 14. When such surge voltage is the cause for the voltage imbalance, it must be cut off. For that purpose, the semiconductor switching device 54 is opened. In this case, too, the switch driver circuit 56 has a large time constant so that it does not erroneously respond to noise. In place of the semiconductor switching device 54, a relay may be used.

Figure 8:
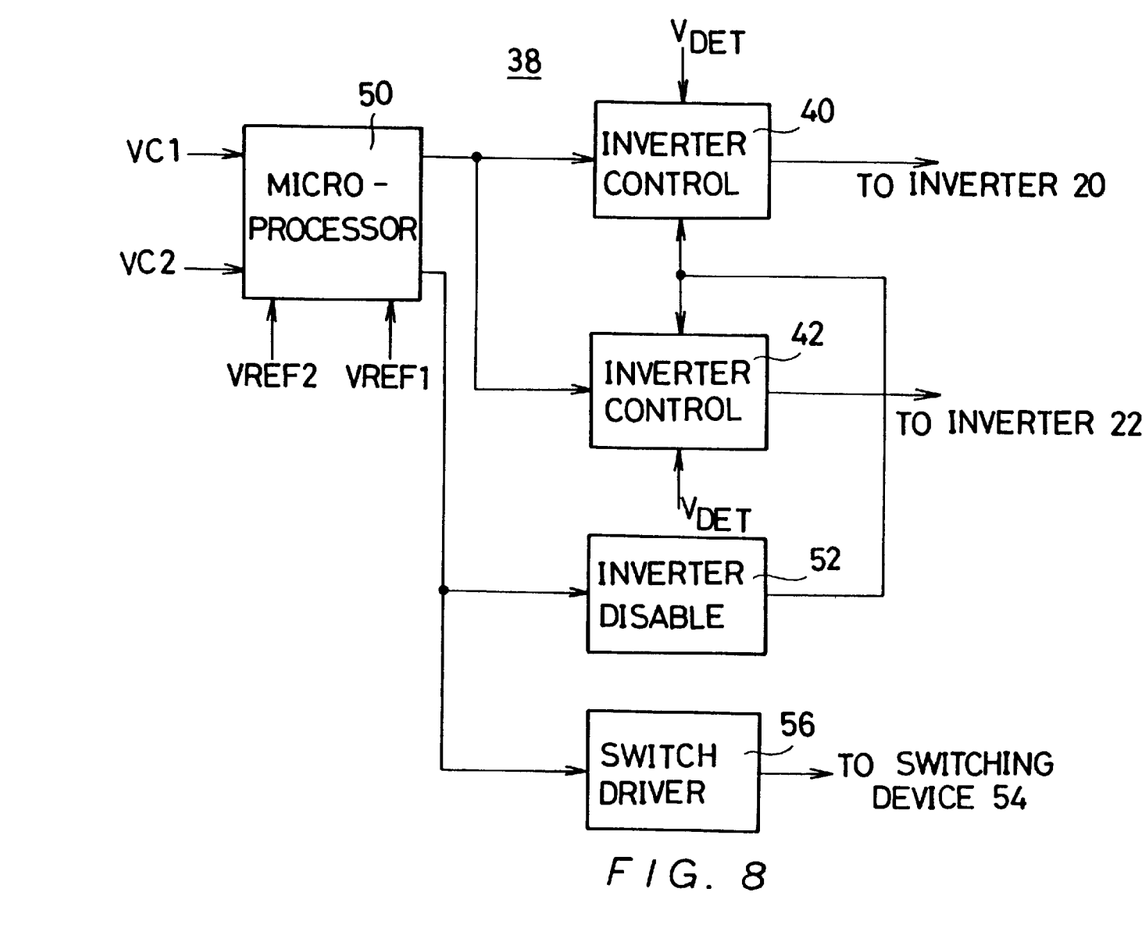
FIG. 8 is a block diagram of a fourth example of the control circuit.
Figure 9:
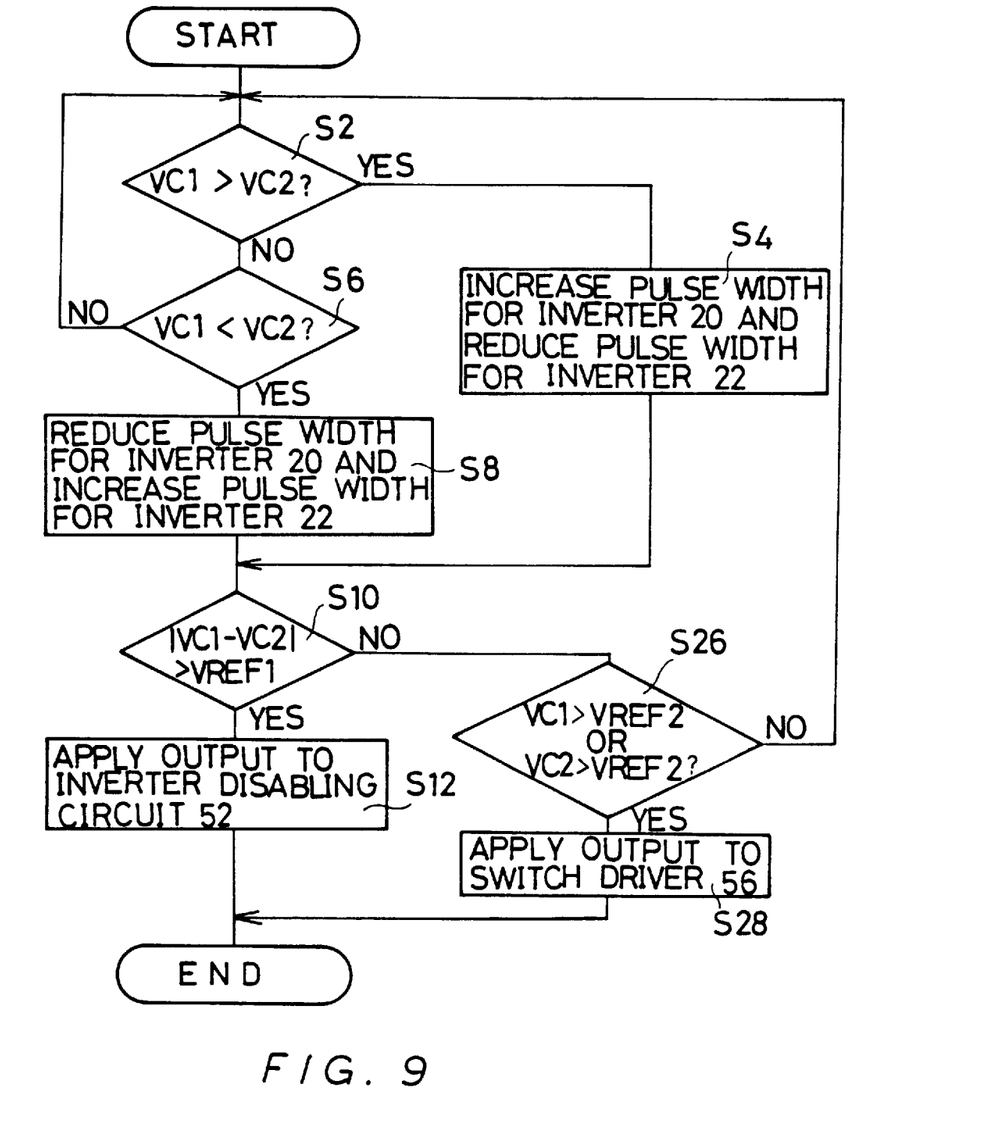
FIG. 9 is a flow chart showing the operation of the circuit shown in FIG. 8.

FIGS. 8 and 9 illustrates a fourth example of the control circuit 38. The reference numerals used for components and functions of the above-described first through third examples of the control circuit 38 are used for similar components and functions shown in FIGS. 8 and 9, and their detailed description is not made. In this example, the reference voltages $V_{REF^1}$ and $V_{REF^2}$ are set in the microprocessor 50. This example includes, in addition to the microprocessor 50, the inverter control circuits 40 and 42, the inverter disabling circuit 52, and the switch driver circuit 56. Also, the semiconductor switching device 54 similar to the one shown in FIG. 6 is used, though it is not shown.

As shown in FIG. 9, the microprocessor 50 executes Steps S2 through S12 in the same manner as described with reference to FIGS. 1 through 3. If it is judged that the absolute value of the difference between VC1 and VC2 is not larger than the reference voltage $V_{REF^1}$ in Step S10, the execution is not returned to Step S2, but the microprocessor 50 makes a judgment as to whether either one of VC1 and VC2 is larger than $V_{REF^2}$ in Step S26. If the result of Step S26 is NO, the microprocessor 50 performs Step S2. If the result of Step S26 is YES, the microprocessor 50 provides an output signal to the switch driver circuit 56 (Step S28).

With this arrangement, both the imbalance of the voltages across the smoothing capacitors 16 and 18 due to variations in characteristic of the inverters 20 and 22, and the imbalance due to superposition of a surge voltage on the commercial AC voltage can be eliminated. In this case, too, the inverter disabling circuit 52 and the switch driver circuit 56 have such a large time constant that they do not erroneously respond to noise.

It is possible to further modify the arrangement shown in FIGS. 8 and 9 to omit Steps S10 and S12 or Steps S2 through S8.

In the examples described above, the microprocessor 50 may be replaced by an arrangement including a comparator for comparing VC1 and VC2, a subtractor for determining the difference between VC1 and VC2, an absolute value determining circuit for determining the absolute value of the output of the subtractor, a comparator for comparing the output of the absolute value determining circuit with the reference voltage $V_{REF^1}$, a comparator for comparing VC1 with $V_{REF^2}$, and a comparator for comparing VC2 with $V_{REF^2}$.

What is claimed is:

1. A DC power supply apparatus comprising:
rectifying means for rectifying an input AC voltage to develop a rectified voltage between two output terminals thereof;
first and second smoothing capacitors connected in series between said output terminals of said rectifying means;
first inverter means receiving a first voltage developed across said first smoothing capacitor, and second inverter means receiving a second voltage developed across said second smoothing capacitor, said first and second inverter means converting said first and second voltages into high-frequency voltages;
voltage transforming means receiving said high-frequency voltages from said first and second inverter means and developing a voltage-transformed high-frequency voltage;
converting means for converting the voltage-transformed high-frequency voltage into a DC voltage;
voltage detecting means for detecting respective ones of said first and second voltages;
comparing means for comparing the absolute value of the difference between said first and second voltages as detected by said detecting means with a reference voltage, and developing an output corresponding to the result of comparison, said reference voltage being the difference between the voltages developed across respective ones of said first and second smoothing capacitors when the voltage across one of said first and second smoothing capacitors is the rated voltage of said one smoothing capacitor; and
disabling means responsive to the output of said comparing means developed when the absolute value of the difference between said first and second voltages is larger than said reference voltage, for disabling said first and second inverter means, said disabling means having a slow response to the output of said comparing means.

2. A DC power supply apparatus comprising:
rectifying means for rectifying an input AC voltage to develop a rectified voltage between two output terminals thereof;
first and second smoothing capacitors connected in series between said output terminals of said rectifying means;
first inverter means receiving a first voltage developed across said first smoothing capacitor, and second inverter means receiving a second voltage developed across said second smoothing capacitor, said first and second inverter means converting said first and second voltages into high-frequency voltages;
voltage transforming means receiving said high-frequency voltages from said first and second inverter means and developing a voltage-transformed high-frequency voltage;
converting means for converting the voltage-transformed high-frequency voltage into a DC voltage;
voltage detecting means for detecting the respective ones of said first and second voltages;
comparing means for comparing the respective ones of said first and second voltages as detected with a reference voltage which is the rated voltage of said first and second smoothing capacitors, and developing an output corresponding to the result of comparison; and
time constant means responsive to the output of said comparing means developed when either one of said first and second voltages is larger than said reference voltage, for causing said first and second inverter means not to develop said high-frequency voltages, said time constant means having a slow response to the output of said comparing means.

3. The DC power supply apparatus according to claim 2 wherein said time constant means is responsive to the output of said comparing means developed when either one of said first and second voltages is larger than said reference voltage for disabling said first and second inverter means.

4. The DC power supply apparatus according to claim 2 wherein said time constant means is responsive to the output of said comparing means developed when either one of said first and second voltages is larger than said reference voltage for interrupting the supply of the AC voltage to said rectifying means.

* * * * *